United States Patent
Savoor

(10) Patent No.: US 8,145,239 B2
(45) Date of Patent: Mar. 27, 2012

(54) LOCATION REGISTER FOR TRUSTED WIFI DEVICES THAT ROAM

(75) Inventor: Raghvendra Savoor, Walnut Creek, CA (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 646 days.

(21) Appl. No.: 12/332,188

(22) Filed: Dec. 10, 2008

(65) Prior Publication Data

US 2010/0144371 A1    Jun. 10, 2010

(51) Int. Cl.
*H04W 88/02* (2009.01)

(52) U.S. Cl. .................................. 455/456.3

(58) Field of Classification Search ............... 455/452.2, 455/453, 456.3
See application file for complete search history.

(56) References Cited

U.S. PATENT DOCUMENTS

| | | | |
|---|---|---|---|
| 2007/0061041 A1* | 3/2007 | Zweig | 700/245 |
| 2008/0072139 A1* | 3/2008 | Salinas et al. | 715/238 |
| 2009/0052870 A1* | 2/2009 | Marsh et al. | 386/124 |
| 2010/0069035 A1* | 3/2010 | Johnson | 455/404.1 |
| 2010/0142447 A1* | 6/2010 | Schlicht et al. | 370/328 |

* cited by examiner

*Primary Examiner* — Diane Mizrahi
(74) *Attorney, Agent, or Firm* — Moazzam & Associates, LLC

(57) ABSTRACT

Devices and methods are disclosed which relate to the gathering and recording of network availability and attributes in a location in order to define location based services. Registration logics onboard mobile communications devices collect network data as they roam inside and outside of their home cellular network. The registration logic sends this data to a registry in the form of a data message. The registry is updated by each instance of a received message. The aggregation of this data allows the system to adaptively learn about network availability in geographic locations. The data collected may also assist in the recovery of lost or stolen phones since the phone location is frequently updated.

28 Claims, 5 Drawing Sheets

```
Location = 38.88680, -77.00533
Network type = ATT 3G
Network strength = 8
Wifi = Home, restaurant, coffee house
Wifi Strength = 9, 3, 5
Open = n, y, y
Bluetooth = no
Bluetooth strength = na
Femtocell = no
Femtocell strength = na
```

5A

```
Location = 44.50000, -108.33400
Network type = VZW 3G
Network strength = 2
Wifi = no
Wifi Strength = na
Open = na
Bluetooth = no
Bluetooth strength = na
Femtocell = no
Femtocell strength = na
```

5B

```
Location = 32.50400, -117.09783
Network type = ATT 3G, SPR 3G
Network strength = 9, 5
Wifi = shop
Wifi Strength = 7
Open = y
Bluetooth = comp, radio
Bluetooth strength = 8, 4
Femtocell = y
Femtocell strength = 9
```

LOCATION REGISTER FOR TRUSTED WIFI DEVICES THAT ROAM

BACKGROUND OF THE INVENTION

1. Field of the Invention

The present invention relates to gathering and recording network information. More specifically, the present invention relates to using a mobile communications device to gather and record network information at a location, the information being then sent to a registry in order to define location based services.

2. Background of the Invention

Mobile communications devices, such as cellular phones, have become tremendously popular. It is estimated that there were 3.3 billion cellular phone subscriptions at the end of 2007. Close to 80% of the world now enjoys cellular coverage, a figure only increasing as new networks appear. Along with the abundance of cellular phones comes the demand for new and improved services. It is no longer enough to just place and receive calls, users want it all.

Cellular phones today often are equipped to handle many types of services and applications. Users can now accomplish many tasks that they previously were forced to do from their home or office, including check their e-mail, surf the internet, and so forth. WiFi capabilities allow users to connect to the internet where wireless access is available. Users have now become very dependent upon these services and feel the need for access all throughout the day. Many individuals no longer have land lines in their homes, instead relying on cellular service. With the fast speed of business, businesses feel the need to have constant contact with their employees, regardless of their location. Calls and e-mails can be sent from most anywhere, allowing even the traveling businessman to stay on top of his work. However, these services may be limited to certain geographical areas, either by their network coverage or available networks in the area, and may be limited by their signal strength.

New networks increase the number of areas with available service. As many newer phones are equipped for WiFi access, WiFi hotspots allow for these phones to connect to the internet. Ad hoc networks such as these WiFi hotspots are appearing with more and more frequency as businesses and even individuals allow for secure and unsecured use. With the emergence of BLUETOOTH, areas with access to BLUETOOTH are also becoming increasingly common. Additionally, the increasing prevalence of femtocells increases areas of network availability. Femtocells, or Access Point Base Stations, connect to service providers' networks via broadband and allow service providers to extend service indoors, especially in areas of limited access. In the future, 4G networks will become prevalent as well. These networks will be the next complete evolution in wireless communications.

Unfortunately, many of the locations of these services, as well as the gaps in services, are unknown to individuals as well as service providers. Service providers are knowledgeable about their own network and the services they provide. However, when an individual is using their cellular phone outside the network, the information is not as well known. Service providers track the location of cellular phones, but not the available services uniquely. Also, many of the networks available in areas, such as WiFi and BLUETOOTH, are unlicensed and therefore there is little data concerning them.

When a user goes into an unfamiliar roaming zone, the user has no idea what services may be available and where. Service providers are often unaware of the need for this information as well as the opportunity to provide services and applications. What is needed is a device which relays available network information at certain locations to a registry, where it is stored and later used.

SUMMARY OF THE INVENTION

The present invention relates to the gathering and recording of network availability and attributes in a location in order to define location based services. Registration logics onboard mobile communications devices collect network data as they roam inside and outside of their home cellular network. The registration logic composes a data message, comprised of the network data collected. The registration logic sends this data message to a registry. The registry is updated by each instance of a received message. The aggregation of this data allows the system to adaptively learn about network availability in geographic locations. The data collected may also assist in the recovery of lost or stolen phones since the phone location is frequently updated.

In an exemplary embodiment of the present invention, the invention is a system for improving the quality of location-based services, comprising a mobile communications device with at least one module for detecting and communicating with a wireless network, a registration logic onboard the mobile communications device, and a registry in communication with the mobile communications device. In this embodiment, the registration logic communicates the status of available wireless networks at a geographic location to the registry.

In another exemplary embodiment of the present invention, the invention is a system for improving the quality of location-based services, comprising a server, a database in communication with the server, and a registration program coupled to a mobile communications device capable of two-way communication with the server. In this embodiment, the registration program collects data concerning a plurality of available networks at a geographic location which is sent to the server to be stored in the database.

In a further embodiment of the present invention, the invention is a method of improving location-based services using a mobile communications device. The embodiment comprises detecting a plurality of available wireless networks within the range of the mobile communications device, a plurality of network attributes, and a geographic location of the mobile communications device; composing a data message which includes information concerning the plurality of available wireless networks, the plurality of network attributes, and the geographic location; and delivering the data message to a registry.

BRIEF DESCRIPTION OF THE DRAWINGS

FIG. 5A shows the contents of a data transmission from a mobile communications device that has detected multiple networks, according to an exemplary embodiment of the present invention.

FIG. 5B shows the contents of a data transmission from a mobile communications device that has detected a network, according to an exemplary embodiment of the present invention.

FIG. 5C shows the contents of a data transmission from a mobile communications device that has detected multiple networks, according to an exemplary embodiment of the present invention.

DETAILED DESCRIPTION OF THE INVENTION

Figure 1:
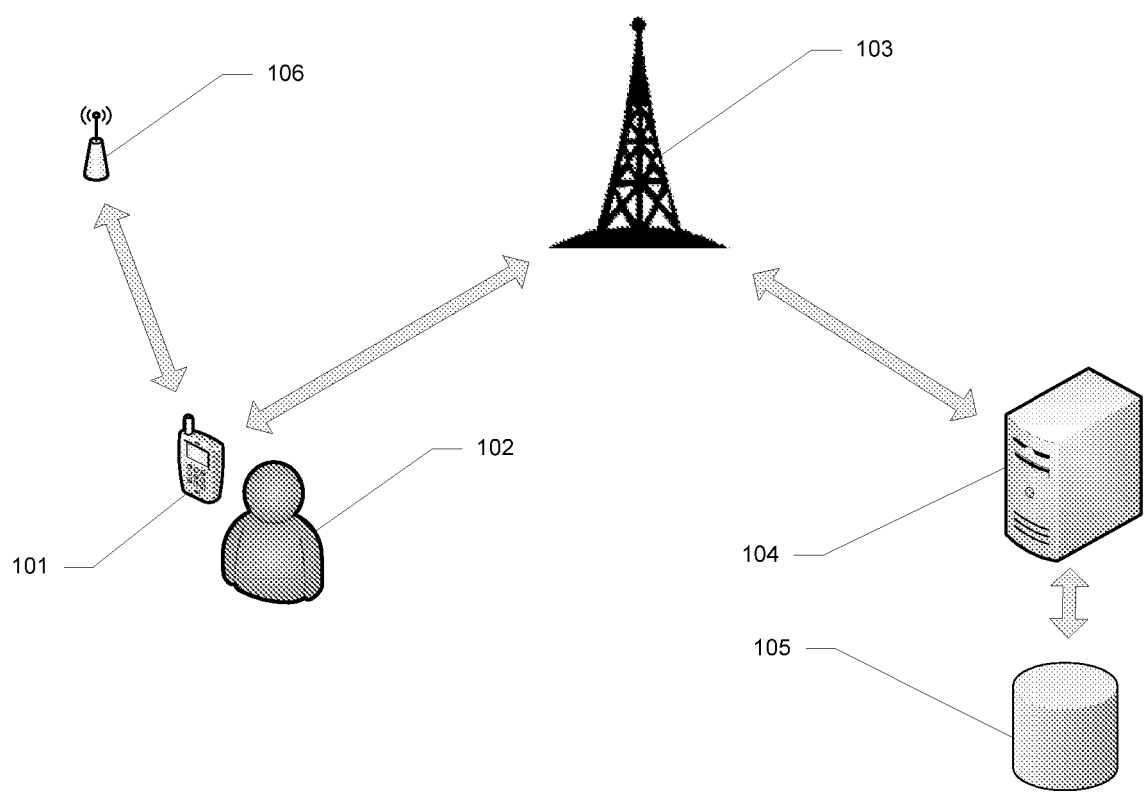
FIG. 1 shows a system utilizing a registration logic and registry, according to an exemplary embodiment of the present invention.

The present invention is a registration logic onboard a mobile communications device which together gathers network availability and attributes at geographical locations and records them to a registry in order to improve location based services. This lightweight registration logic onboard a mobile communications device collects data concerning the availability of cellular, WiFi, BLUETOOTH, and other networks and their attributes as well as other devices in the area. Attributes of these networks include the type of network, the available services, the signal strength, etc. The registration logic then composes a message using XML, raw text, or some other lightweight form of data. Finally, the registration logic sends this data to the registry through the mobile communications device's cellular, WiFi, BLUETOOTH, or other data connection. The registry is a database that compiles a plurality of this data as it streams in from a plurality of mobile communication devices. Updates to the registry by a multitude of users allow the system to adaptively learn about available service locations and their attributes. The data is stored so that it can be analyzed and focused to gain knowledge of and better provide location based services. The data also allows the service provider to track the location and use of mobile communications devices. This feature can be used to track lost or stolen devices.

A "mobile communications device," as used herein and throughout this disclosure, refers to a wireless device used for communication. This includes devices such as a cellular telephone, personal digital assistant (PDA), portable computer, pager, etc.

"Roam," as used herein and throughout this disclosure, refers to the condition of a cellular telephone as it travels outside of its home network. Roaming is not limited to a cellular telephone traveling outside its service provider's network, but can simply mean that the telephone is outside a 3G network, or outside a digital network. A cellular telephone may still "roam" near a network supplied by its own service provider if that network is merely analog. A cellular telephone is considered "roaming" if it is in a 3G network owned by a service provider other than its own.

"Network," as used herein and throughout this disclosure, refers to any union established by mere communication between two or more devices. A network can be a WiFi network comprising a server and multiple devices, a BLUETOOTH peer-to-peer network in which only two devices are allowed, a cellular network consisting of many servers and devices, etc.

In an exemplary embodiment of the present invention, the invention collects network data at a certain geographical location and sends it to a registry. When a mobile communications device user roams, either in the subscriber's own network or outside the network, their mobile communications device's onboard registration logic collects available network data. The registration logic additionally may collect data in the subscriber's home network, as new ad hoc networks arise frequently. After collecting this data, the registration logic sends a data transmission back to the registry. For example, a user may travel into a town outside of their service provider's network. The user's cellular phone is WiFi enabled so he searches around to find free WiFi. As the user is in an unknown area to the user's service provider, the service provider does not know of the services available in the area. Alternatively, new networks, such as WiFi and BLUETOOTH, maintained by individuals sprout up frequently, creating a need for constant updating. After a long search, the user finally finds a coffee shop where his cellular phone connects to the shop's wireless network. During the user's time in the roaming network, a registration logic in the user's cellular phone periodically updates the registry with available services in the area it is currently located. This update may occur at specified intervals of time or after certain events, depending upon the registration logic's settings. While the user is searching for a WiFi signal, the registration logic transmits to the registry that there are not any WiFi networks in that specific location. The registration logic also transmits data such as signal strength, available networks and features, etc. When the user connects to the coffee shop's wireless network, the registration logic informs the registry of this network, its attributes, location, etc. The registry then has knowledge of the network which it can later use.

FIG. 1 shows a system utilizing a registration logic and registry, according to an exemplary embodiment of the present invention. In this embodiment, the system includes a mobile communications device 101, a cellular tower 103, a server 104, and a registry 105. A user 102 travels into a location where a registration logic onboard mobile communications device 101 detects a wireless access point 106. Wireless access point 106 can be a part of any type of network. Among the possibilities are WiFi, BLUETOOTH, femtocell, cellular networks including 3G and 4G networks, etc. Other forms of detected networks are apparent to one with knowledge and skill in the art. Once wireless access point 106 is detected, the registration logic of mobile communications device 101 records the time, location, signal strength, and other attributes of the network, as well as attributes of any other networks detected at the same location. The data is sent over a data line in the form of a data message. The data is relayed through cell tower 103 to server 104. Server 104 records the data in registry 105, adding it to previously stored information. The registration logic of mobile communications device 101 sends the data either at the happening of an event or at a specified time. When connected to a wireless network through wireless access point 106, the registration logic of mobile communications device 101 may send the data transmission over the connection to the network rather than through cellular service. This may be necessary in cellular networks which do not have adequate data service.

Because the mobile communications devices are periodically relaying data, including the location of the device, the service provider can locate specific devices. This feature assists the service provider in the retrieval of lost or stolen devices. In embodiments of the present invention, even when a device is lost or stolen, the device transmits its location and service availability data. This allows the service provider to locate the device. In the event that the registration logic is set to transmit only at an event, it may not transmit often. The registry can remotely reprogram the registration logic to transmit at intervals of time. This may increase the number of transmissions, making locating the device more likely.

The registration logic collects data concerning the available networks in the area and their attributes. The registration logic is essentially a lightweight software program onboard a mobile communications device. It is capable of two-way communication with the registry through the server.

Figure 2:
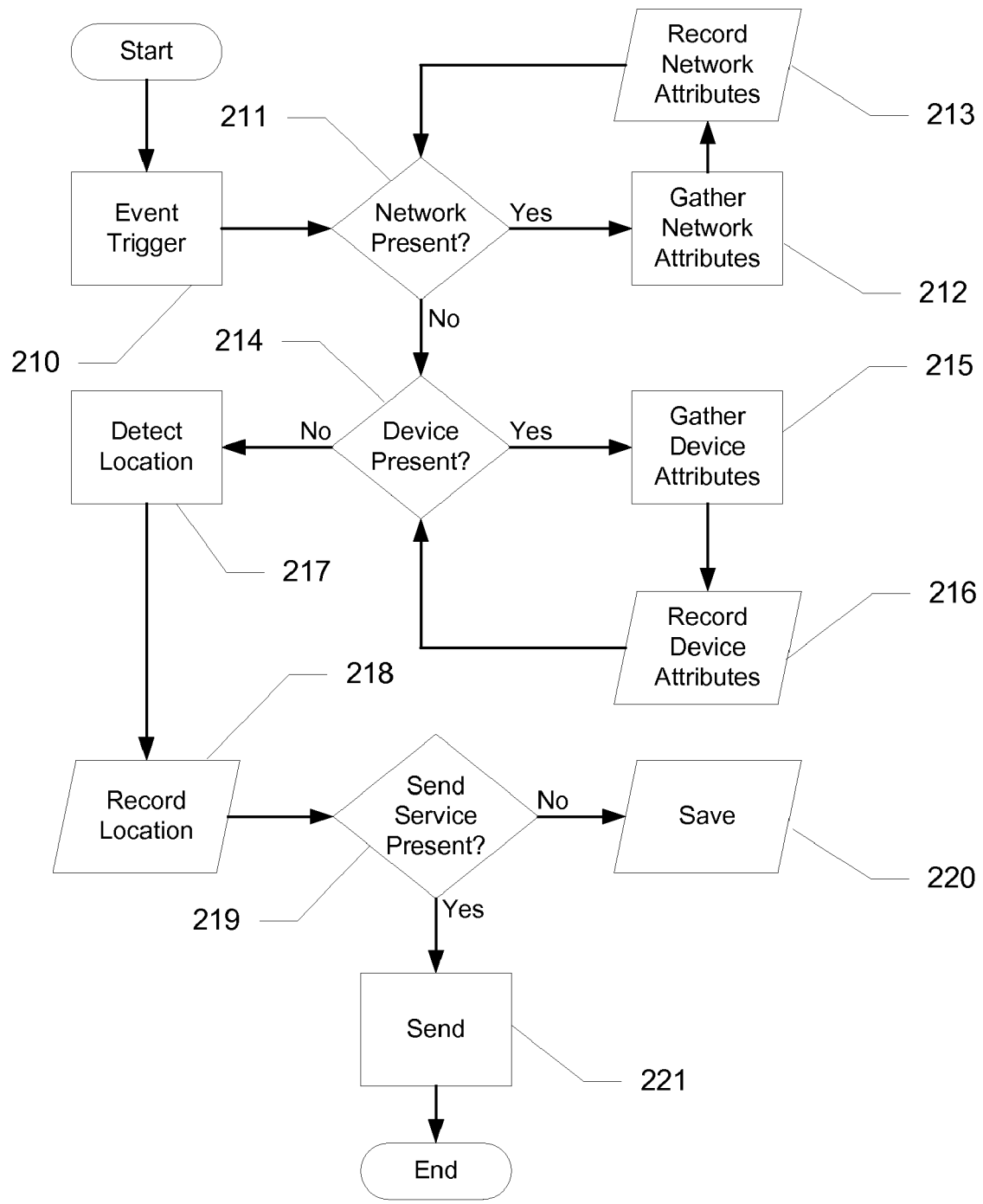
FIG. 2 shows a flow chart of the process of a registration logic, according to an exemplary embodiment of the present invention.

FIG. 2 shows a flow chart of the registration logic, according to an exemplary embodiment of the present invention. In this embodiment, a service provider provisions each mobile communications device to collect and then relay data back to the registry at certain intervals of time. This may be done as a "heartbeat", in which the registration logic sends data at set intervals of time. Alternatively or in addition, the transmission can be event based. An event based transmission occurs at the happening of one of any number of specified events. Events include, but are not limited to, turning the device on, switching cellular towers, detecting a network, connecting or disconnecting to a network, detecting a strong or weak cellular signal, etc. The heartbeat or event 210 begins the process. Once the process has begun, registration logic detects an available network 211. This registration logic communicates with one of the onboard devices such as WiFi and BLUETOOTH adaptors. This data may include multiple instances of a type of network. For instance, the registration logic may detect multiple WiFi networks at a location. The identification, type, and strength of each of one these networks is gathered 212 and recorded 213 into an XML file, then the next network is detected. Next, nearby devices are detected 214, and their attributes are gathered 215 and recorded 216 into the XML file. After all the networks and devices have been detected and recorded, the registration logic detects the geographical location of the device 217. This may be done in many ways, including triangulating position based on cellular towers, an onboard GPS locator, assisted GPS, etc. Once the location is detected, it is recorded 218 in the XML file. Once the available data is collected, it is time to send the XML file to the registry. The registration logic detects an available service 219 that it can send the XML file through. A suitable service can be a digital cellular signal which can send the XML file directly or merely an open WiFi network where the XML file can be sent over the internet to the registry. If a suitable network is present, then the registration logic sends the data to a registry 221. If a suitable network is not present, then the registration logic saves the XML file 220 to be sent at a later time when a suitable network is present. In alternative embodiments, registration logic constantly collects network data. In these embodiments, the data is sent back to the registry at either a heartbeat or event.

Mobile communication devices are often capable of detection of and connection with multiple types of networks. This is largely due to network adaptors onboard the device. Embodiments of the present invention include adaptors to detect and connect to these multiple types of networks. In further embodiments, the registration logic is equipped to detect each of the networks independently of these adaptors.

Figure 3:
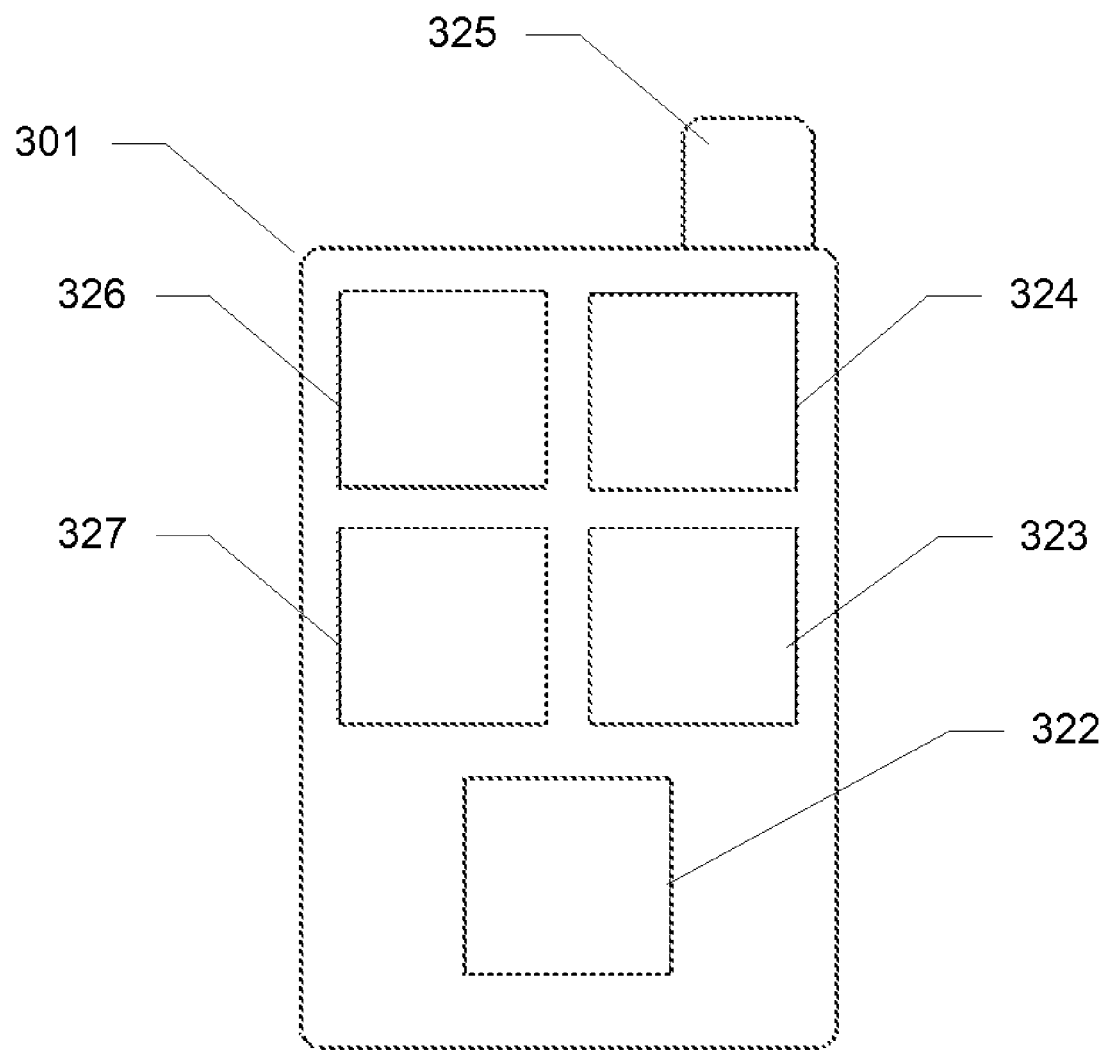
FIG. 3 shows a mobile communications device with an onboard registration logic, according to an exemplary embodiment of the present invention.

FIG. 3 shows a mobile communications device with an onboard registration logic, according to an exemplary embodiment of the present invention. In this embodiment, a mobile communications device 301 comprises a power supply 322, a memory unit 327, an antenna 325, a WiFi adaptor 323, a BLUETOOTH adaptor 324, and an onboard registration logic 326. Onboard registration logic 326 is a lightweight software program and works in the background of the other features of the mobile communications device. Thus, registration logic 326 preferably does not affect the use of the other features of the device. Registration logic 326 is capable of two way communication, able to receive communications and settings from registry as well as send out data transmissions. The sending and receiving may utilize mobile communications device 301's antenna. Power supply 322 is connected to each component to provide a source of power. Memory unit 327 stores functions and features. Memory unit 327 may store data collected by registration logic 326 before it is sent. Alternatively, registration logic 326 has its own dedicated or internal memory responsible for the storage of this data. Antenna 325 allows mobile communications device to send and receive signals from cellular towers. Antenna 325 may also be utilized by WiFi adaptor 323 or BLUETOOTH adaptor 324 to connect with these respective types of networks. WiFi adaptor 323 provides for connection to available wireless networks in the area as well as detection of available networks and their signal strength. This information is sent to registration logic 326. BLUETOOTH adaptor 324 allows mobile communications device to connect wirelessly with other BLUETOOTH enabled devices. BLUETOOTH signals are generally limited to very short distances. Both the BLUETOOTH signal strength detected by BLUETOOTH adaptor 324 as well as the type of BLUETOOTH device the signal is coming from are sent to registration logic 326. With the available data, registration logic 326 composes a data message which registration logic 326 sends to the registry.

A device capable of detecting many forms of networks may be in an environment where more than one network, or type of network, is available. Availability of each of these networks is useful information to the service provider as well as subscribers. Because it is useful, as much of the data as possible is collected by the registration logic to send to the registry. The amount and type of data collected and sent may be determined by the registry, which, in turn, communicates the settings to the registration logic.

Figure 4:
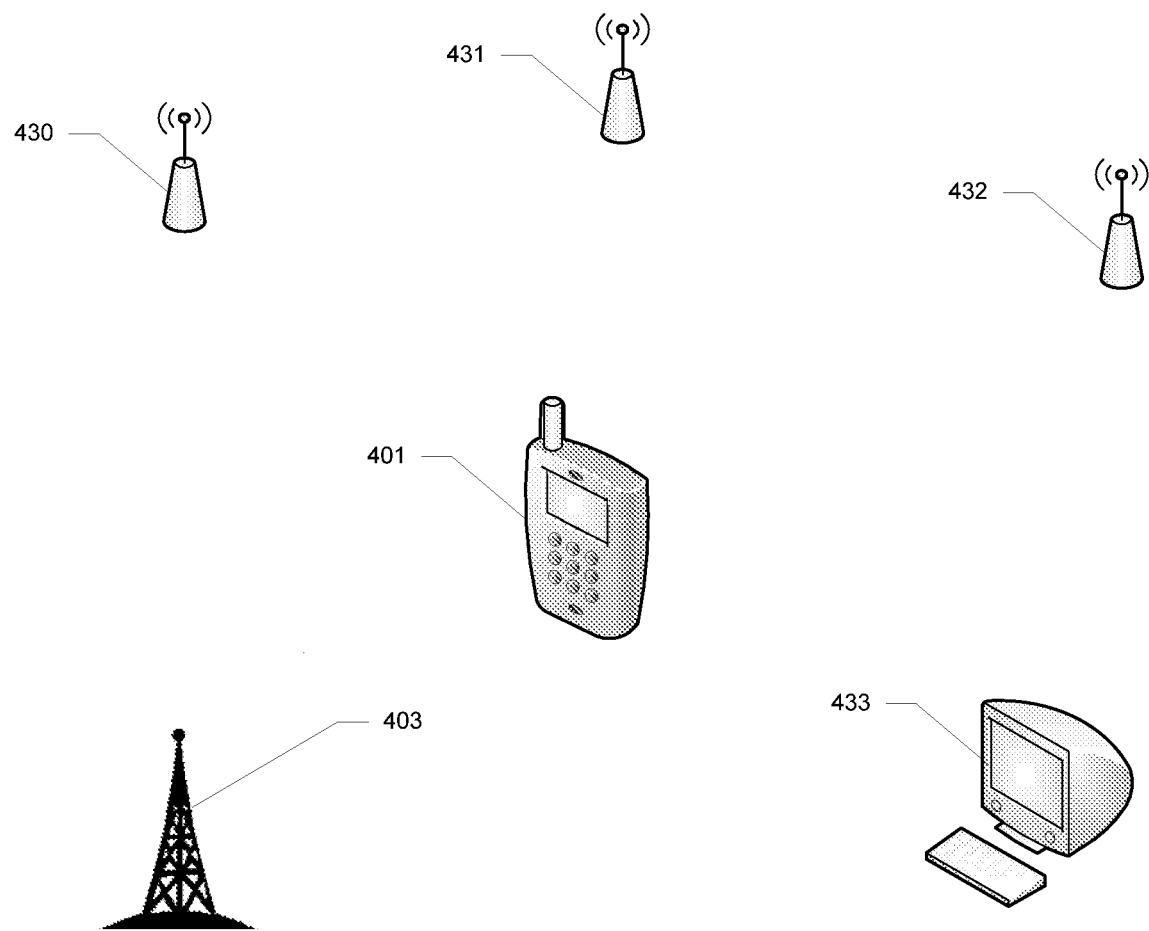
FIG. 4 shows a mobile communications device in an environment with multiple signals, according to an exemplary embodiment of the present invention.

FIG. 4 shows a mobile communications device in an environment with multiple signals, according to an exemplary embodiment of the present invention. In this embodiment, a mobile communications device 401 detects the signal of a closed private WiFi network 430, a femtocell 431, a cellular network 403, an open WiFi network 432, and a BLUETOOTH computer link 433. Cellular network 403 may be the network mobile communications device 401 is connected to or another available network. Cellular network 403, provided its signal strength is adequate and it supports data transmission, allows mobile communications device 401 to communicate with a registry where data concerning available networks is stored. This communication includes the strength and type of cellular network 403 itself. Femtocell 431's availability and signal strength provide data concerning the boosting of certain signals in buildings and other areas where cellular service is otherwise weak or lacking. The knowledge of femtocell 431 allows many possibilities. Service providers may steer their subscribers towards this location in the event of an otherwise weak cellular signal. Service providers may also gain knowledge of where other femtocells may be necessary to provide adequate service. Open WiFi network 432 allows mobile communications device 401 to connect to and access the internet. Mobile communications device 401 gathers the data concerning the availability and other attributes of the network. This data is useful for directing subscribers to the location as well as contracting with the location. Open WiFi network 432 also provides the ability to send network data back to the registry over the WiFi connection. Closed private WiFi network 430, despite mobile communications device 401's inability to currently connect, is reported to the registry along with the network's strength at the location. Service providers may later contract to use closed WiFi network 430, turning it to an open network or one available to their subscribers. BLUETOOTH allows for connection to another device for short range data transfer. The location information of BLUETOOTH availability can be used by both subscribers and service providers. With the expanding uses of BLUETOOTH, the knowledge of the location of devices and services gives subscribers greater access. Service providers can take the provided data and determine locations that have or are lacking these networks and services. Areas where there is no BLUETOOTH access may prove to be an area where a service may be useful and in demand. In these cases, service providers, or other businesses or individuals, may provide the needed service. BLUETOOTH computer link 433 allows mobile communications device 401 to connect wirelessly with the computer. This allows mobile communications device 401 access to download files from the computer, transfer files to the computer, access the internet, etc.

FIGS. 5A-5C show the contents of data transmissions to a registry from an onboard registration logic, according to an exemplary embodiment of the present invention. In these embodiments, an onboard registration logic collects data concerning available networks, their strength, their location, etc. This data is stored in the device's memory and converted to a data message, such as one using XML. The data message should be as small as possible in order to decrease the amount of data sent and allow the registration logic to work in the background without affecting other functions of the mobile communications device. In alternative embodiments, the onboard registration logic contains its own memory, such that it works independent of the rest of the phone.

FIG. 5A shows the contents of a data transmission from a mobile communications device that has detected multiple networks, according to an exemplary embodiment of the present invention. In this embodiment, the location of the mobile communications device is reported as GPS coordinates (38.88680, −77.00533). The cellular network being used by the mobile communications device is an AT&T 3G network. The data message may additionally list other cellular networks available at the location. The strength of the signal of the 3G network is 8 out of 10. This scale can be expanded or contracted based upon the specificity of data desired. Three WiFi networks are detected, with names Home, Restaurant, and Coffee House. The Home signal strength is 9 out of 10, the Restaurant 3, and the Coffee House 5. The Home WiFi network is closed while the other two are open. The "n" refers to no while the "y" refers to yes. With these signal strengths, in the event a subscriber needs help finding a WiFi network, service provider may steer the subscriber towards the Restaurant or Coffee House WiFi. Because the Home network signal is strong in the area, a service provider may wish to license with this owner to provide access for subscribers. No BLUETOOTH signals are detected in the current location. Because the BLUETOOTH networks are not present, the strength is not applicable. No femtocell is detected in the area. Because there is no femtocell, the femtocell strength is also not applicable. If the geographic location did not receive a strong cellular signal, such as if it was in a building, a service provider may see the area as an idea location for a femtocell to provide a stronger signal.

FIG. 5B shows the contents of a data transmission from a mobile communications device that has detected a network, according to an exemplary embodiment of the present invention. In this embodiment, the location of the mobile communications device is reported as GPS coordinates (44.50000, −108.33400). The cellular network being used by the mobile communications device is a VERIZON WIRELESS 3G network. The strength of this network at the geographical location is rated a 2 out of 10. There are also no WiFi, BLUETOOTH, or femtocells in this area. With this provided data as well as the number of subscribers in the area, service provider may determine that certain new networks are necessary. This may be based upon the capabilities that subscribers are seeking in the area.

FIG. 5C shows the contents of a data transmission from a mobile communications device that has detected multiple networks, according to an exemplary embodiment of the present invention. In this embodiment, the location of the mobile communications device is reported as GPS coordinates (32.50400, −117.09783). The cellular network being used by the mobile communications device is an AT&T 3G network. The data message additionally lists a SPRINT 3G cellular network as being available in the location. The strength of the signal of the AT&T 3G network is 9 out of 10 with the strength of the signal of the SPRINT network 5 out of 10. One WiFi network is detected, Shop network. The Shop network's signal strength is 7 and is an open network, denoted by the "y" next to "Open". Two BLUETOOTH signals are detected in the current location, a computer and a radio. The strengths of these BLUETOOTH networks are 8 and 4 respectively. A femtocell is also detected in the area, denoted by "y" next to "Femtocell". The femtocell strength is rated 9 out of 10, likely meaning the femtocell is in a building at the geographic location.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for registering location-based services, the system comprising:
    a mobile communications device with at least one module for detecting and communicating with a wireless network at a geographic location;
    a registry in communication with the mobile communications device; and
    a registration logic onboard the mobile communications device, the registration logic for detecting and recording an availability and an attribute of the wireless network, composing a message including the availability, the attribute, and the geographic location, and transmitting the message to the registry;
    wherein the registry includes logic for associating a plurality of location-based services with the geographic location.

2. The system in claim 1, wherein the registration logic communicates with the registry over a data connection.

3. The system in claim 2, wherein the data connection is a WiFi connection.

4. The system in claim 2, wherein the data connection is a cellular data connection.

5. The system in claim 2, wherein the message is in the form of an Extensible Markup Language (XML) message.

6. The system in claim 2, wherein the available wireless network is one or more of a cellular network, a WiFi network, a BLUETOOTH network, and a femtocell.

7. The system in claim 1, wherein the registry communicates through a server.

8. The system in claim 1, wherein the geographic location is determined by a Global Positioning System (GPS) module onboard the mobile communications device.

9. The system in claim 1, wherein the registration logic resides on a dedicated memory.

10. A system for registering location-based services, the system comprising:
a server on a network;
a database in communication with the server;
a mobile communications device capable of two-way communication with the server over the network, the mobile communication device having at least one module for detecting and communicating with a wireless network at a geographical location; and
a registration program coupled to a mobile communications device, the registration program including instructions for collecting data concerning a plurality of available networks at the geographic location, and transmitting the data to the server to be stored on the database.

11. The system in claim 10, wherein the registration program communicates with the server over a data connection.

12. The system in claim 11, wherein the data connection is a WiFi connection.

13. The system in claim 11, wherein the data connection is a cellular data connection.

14. The system in claim 11, wherein the data sent to the server by the registration program is in the form of an XML message.

15. The system in claim 11, wherein the plurality of available networks is one or more of a cellular network, a WiFi network, a BLUETOOTH network, and a femtocell.

16. The system in claim 10, wherein the geographic location is determined by a GPS module onboard the mobile communications device.

17. The system in claim 10, wherein the registration program stores the collected data on a dedicated memory.

18. A method for registering location-based services using a mobile communications device, the method comprising:
detecting a plurality of available wireless networks within a range of the mobile communications device, a plurality of network attributes for each of the plurality of available wireless networks, and a geographic location of the mobile communications device;
composing a data message including information concerning the plurality of available wireless networks, the plurality of network attributes, and the geographic location; and
delivering the data message to a registry on a network, the data message being used by the registry to associate a plurality of location-based services with the geographic location.

19. The method of claim 18, wherein the available wireless network is one or more of a cellular network, a WiFi network, a BLUETOOTH network, a femtocell.

20. The method of claim 18, wherein the delivering is accomplished over a data connection.

21. The method of claim 20, wherein the data connection is a WiFi connection.

22. The method of claim 20, wherein the data connection is a cellular data connection.

23. The method of claim 20, wherein the data message is in the form of an XML message.

24. The method of claim 18, wherein the geographic location is determined by a GPS module onboard the mobile communications device.

25. The method of claim 18, further comprising storing the information concerning the plurality of available wireless networks, the plurality of network attributes, and the geographic location on a dedicated memory.

26. The method of claim 18, wherein the registry communicates with the registration logic through a server.

27. The method in claim 18, further comprising saving the data message to a memory for later sending.

28. The method in claim 27, further comprising sending the data message once a data connection is found.

\* \* \* \* \*